United States Patent
Prasad et al.

(10) Patent No.: US 11,284,313 B2
(45) Date of Patent: Mar. 22, 2022

(54) COMMUNICATION METHOD, COMMUNICATION SYSTEM, AND USER EQUIPMENT

(71) Applicant: NEC Corporation, Tokyo (JP)

(72) Inventors: Anand Raghawa Prasad, Tokyo (JP); Sivakamy Lakshminarayanan, Chennai (IN); Sivabalan Arumugam, Chennai (IN); Sheeba Backia Mary Baskaran, Chennai (IN); Hironori Ito, Tokyo (JP); Toshiyuki Tamura, Tokyo (JP); Hisashi Futaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 260 days.

(21) Appl. No.: 16/617,595

(22) PCT Filed: May 25, 2018

(86) PCT No.: PCT/JP2018/020235
§ 371 (c)(1),
(2) Date: Nov. 27, 2019

(87) PCT Pub. No.: WO2018/221425
PCT Pub. Date: Dec. 6, 2018

(65) Prior Publication Data
US 2020/0145886 A1 May 7, 2020

(30) Foreign Application Priority Data
May 29, 2017 (IN) .............................. 201711018750

(51) Int. Cl.
*H04W 4/00* (2018.01)
*H04W 36/00* (2009.01)
(Continued)

(52) U.S. Cl.
CPC ....... *H04W 36/0058* (2018.08); *H04M 15/66* (2013.01); *H04W 8/08* (2013.01);
(Continued)

(58) Field of Classification Search
CPC ............. H04W 24/10; H04W 36/0005; H04W 36/0055; H04W 36/0058; H04W 36/0061;
(Continued)

(56) References Cited

U.S. PATENT DOCUMENTS

2013/0189990 A1* 7/2013 Kim ..................... H04B 17/382
455/436
2014/0099952 A1   4/2014 Bhatnagar et al.
(Continued)

FOREIGN PATENT DOCUMENTS

JP         2011-510595 A    3/2011

OTHER PUBLICATIONS

3GPP TS 23.501, V0.4.0 (Apr. 2017), "3rd Generation Partnership Project; Technical Specification Group Services and System Aspects; System Architecture for the 5G System; Stage 2 (Release 15)," Apr. 2017, pp. 1-124.
(Continued)

*Primary Examiner* — Matthew W Genack
(74) *Attorney, Agent, or Firm* — Sughrue Mion, PLLC

(57) ABSTRACT

The present disclosure relates to secure provisioning of UE mobility restriction by extending neighbour relation tables to include mobility restrictions in addition to neighbour cell information and sending neighbour cell restriction information (per UE) to the UE, gNB, UE and gNB. The present invention also provides a method and apparatus and a system for mapping mobility restrictions with TA list and sending the TA list along with the Handover Restriction List during handover.

15 Claims, 10 Drawing Sheets

(51) Int. Cl.
  *H04W 76/11* (2018.01)
  *H04M 15/00* (2006.01)
  *H04W 8/08* (2009.01)
  *H04W 48/02* (2009.01)
  *H04W 48/16* (2009.01)

(52) U.S. Cl.
  CPC . *H04W 36/0061* (2013.01); *H04W 36/00835* (2018.08); *H04W 48/02* (2013.01); *H04W 48/16* (2013.01); *H04W 76/11* (2018.02)

(58) Field of Classification Search
  CPC ......... H04W 36/0085; H04W 36/0088; H04W 36/0094; H04W 36/30
  See application file for complete search history.

(56) References Cited

U.S. PATENT DOCUMENTS

| | | | |
|---|---|---|---|
| 2015/0208302 A1 | 7/2015 | Uemura | |
| 2016/0029253 A1 | 1/2016 | Sarkar et al. | |
| 2017/0238247 A1* | 8/2017 | Chandrashekar | H04W 48/16 455/436 |
| 2018/0262958 A1* | 9/2018 | Melin | H04W 36/0085 |

OTHER PUBLICATIONS

3GPP TS 36.300, V14.2.0 (Mar. 2017), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Mar. 2017, pp. 1-330.

Samsung, LG Electronics, SAWG2 Meeting #119, S2-171478, "Mobility Restriction Update," Feb. 13-17, 2017, pp. 1-3.

Nokia, Alcatel-Lucent Shanghai Bell, "NAS/AS modeling for NR IDLE," 3GPP TSG-RAN WG2 Meeting #97bis, R2-172765, Apr. 3-7, 2017, 8 pages.

LG Electronics, Ericsson, "Update to Mobility Restriction," SAWG2 Meeting #121, S2-173380, May 15-19, 2017, pp. 1-3.

NTT Docomo, "TS 23.502: Registration procedure changes for EPS to NGS idle mode mobility wth Nx interface," SAWG2 Meeting #120, S2-173318, May 15-19, 2017, pp. 1-6.

Written Opinion of the International Searching Authority of PCT/JP2018/020235 dated Jul. 31, 2018.

International Search Report of PCT/JP2018/020235 dated Jul. 31, 2018.

Japanese Office Action for JP Application No. 2019-565357 dated Mar. 9, 2021 with English Translation.

Communication dated Apr. 8, 2020, from the European Patent Office in European Application No. 18808664.9.

ZTE, "ANRF for NR", 3GPP TSG RAN WG3 Meeting #95bis, R3-171015, Apr. 3-7, 2017, Spokane, USA, pp. 1-3 (3 pages total).

Huawei, "Slice Awareness of Availability during Mobility" 3GPP TSG-RAN WG3 95bis, R3-171250, Apr. 3-7, 2017, Spokane, Washington, USA, pp. 1-4 (4 pages total).

* cited by examiner

[Fig. 1]
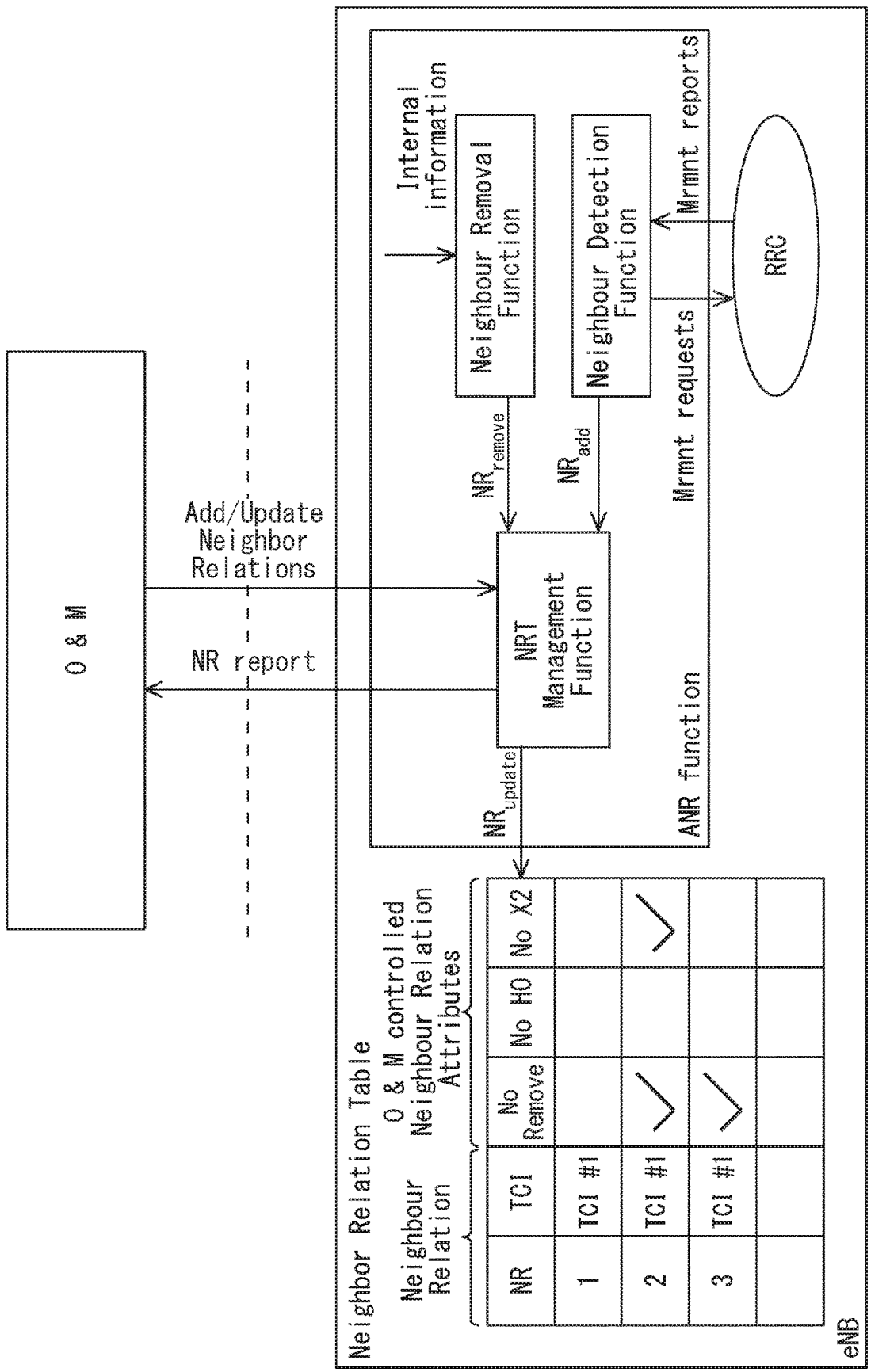

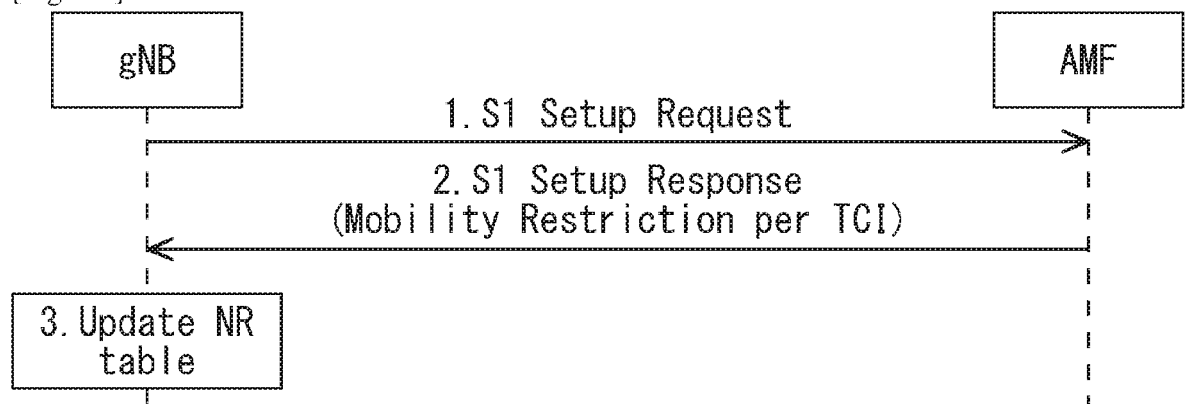
[Fig. 2A]
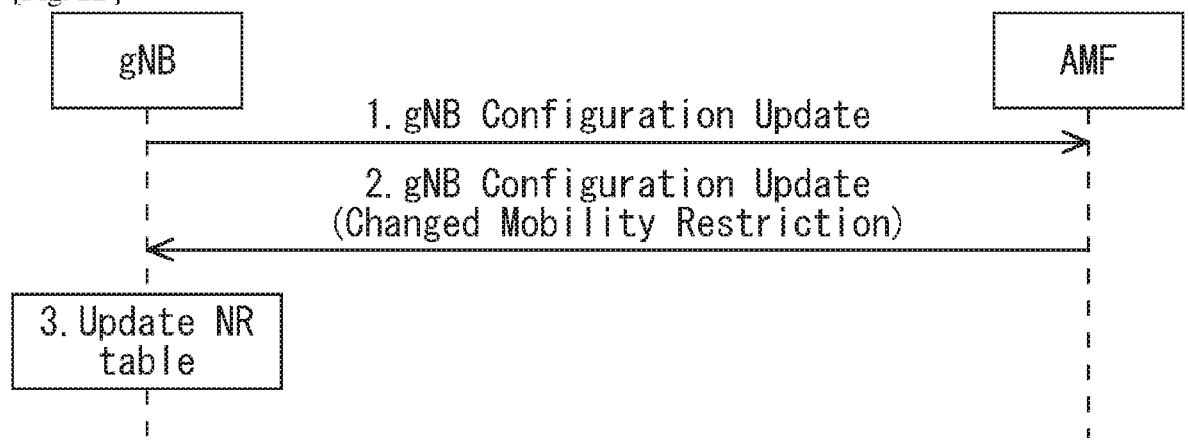
[Fig. 2B]

[Fig. 2C]
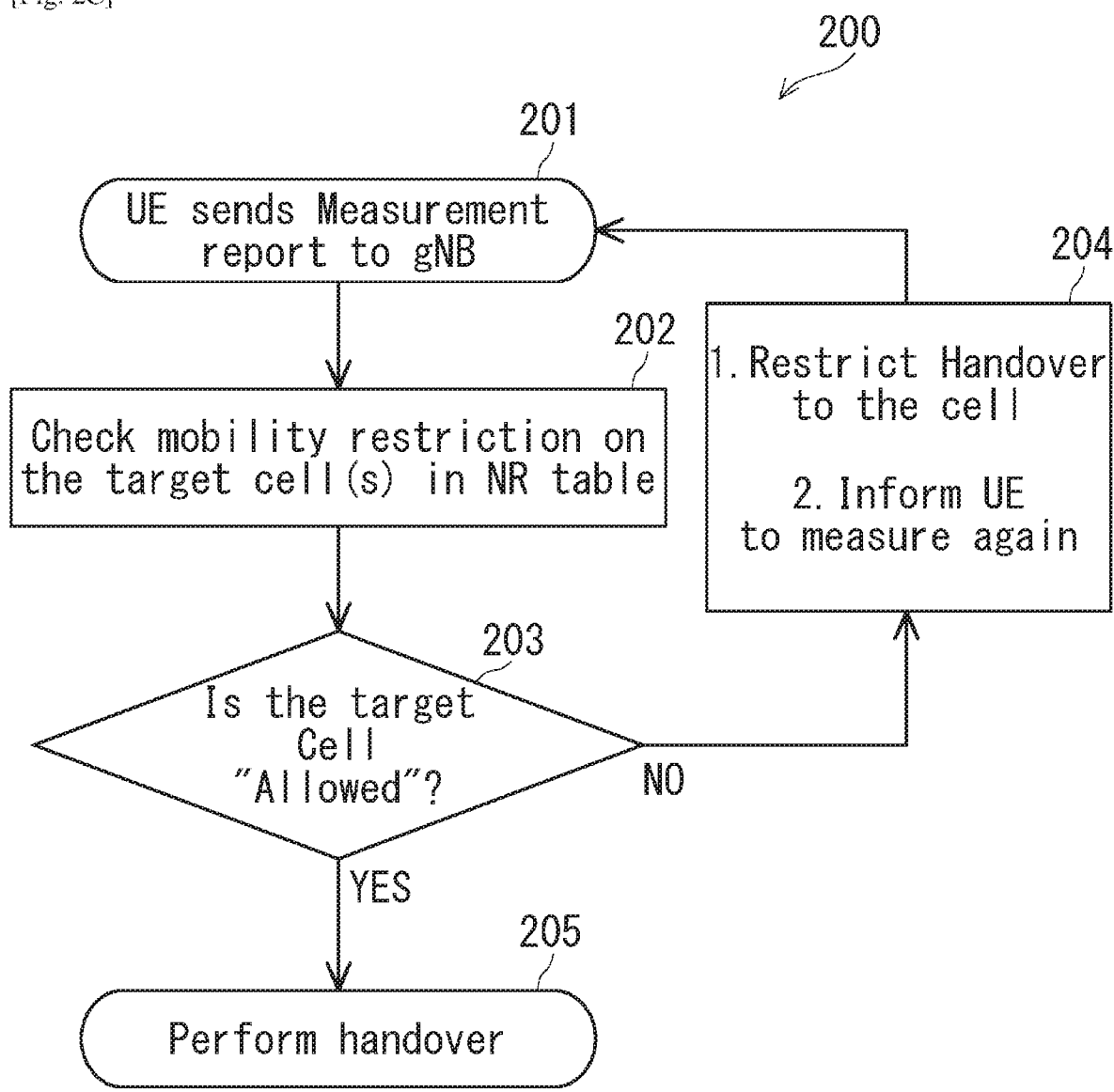

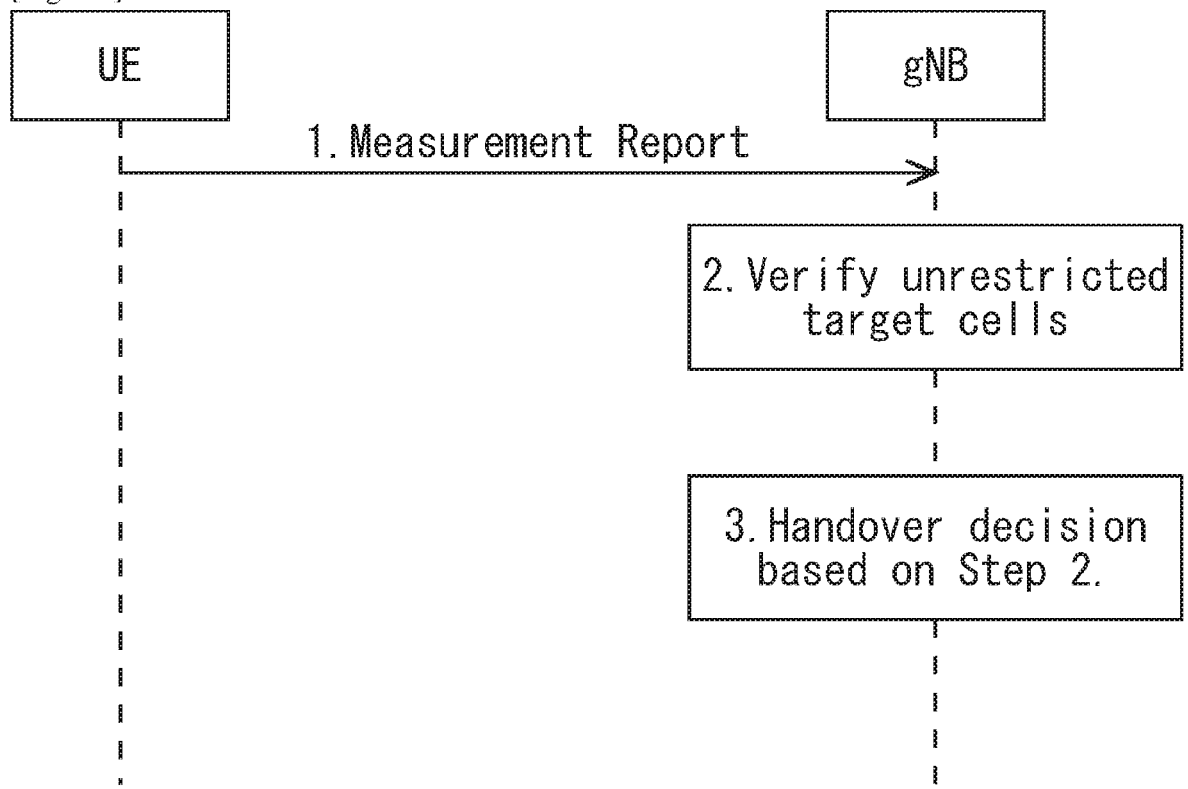

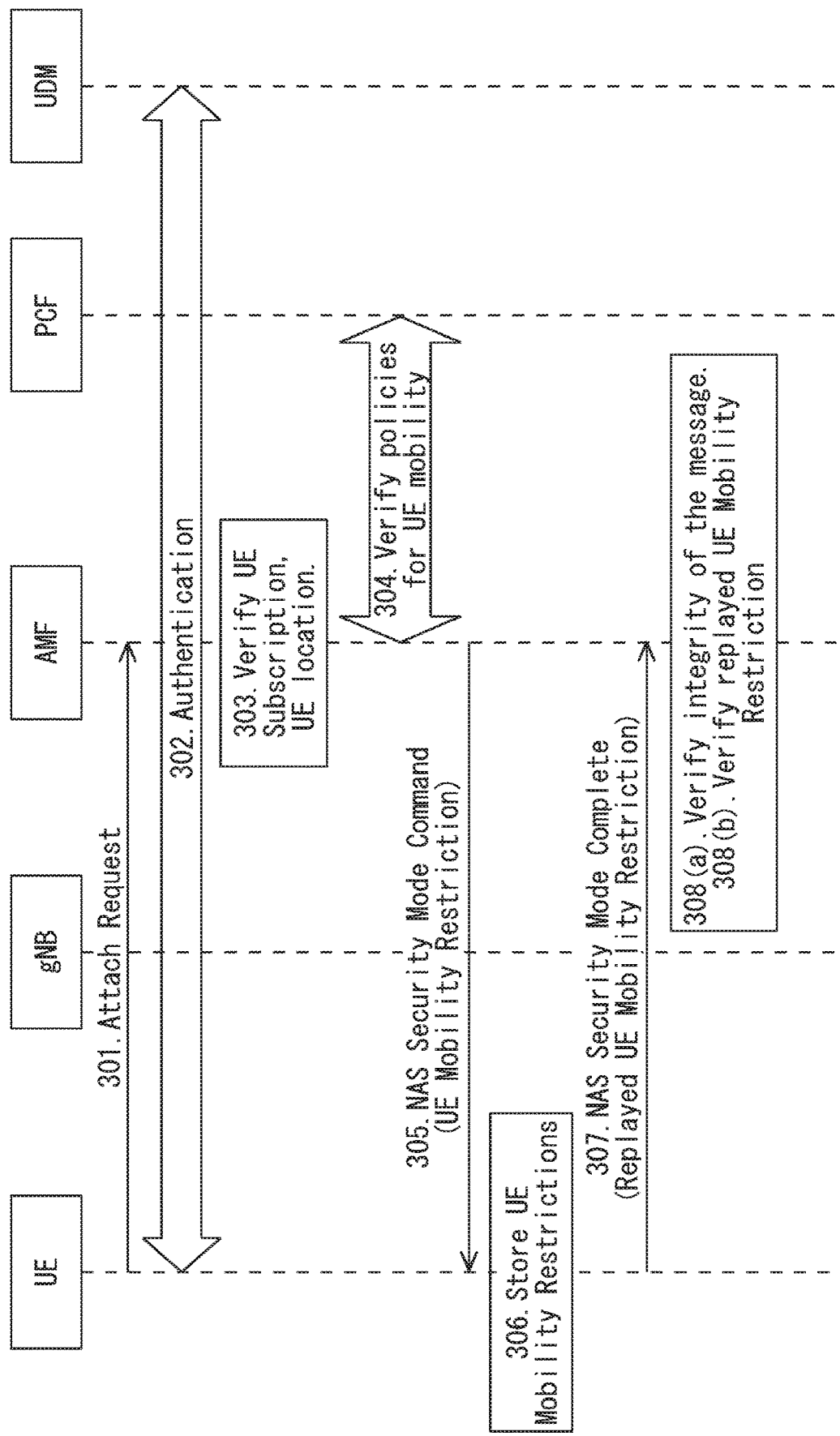

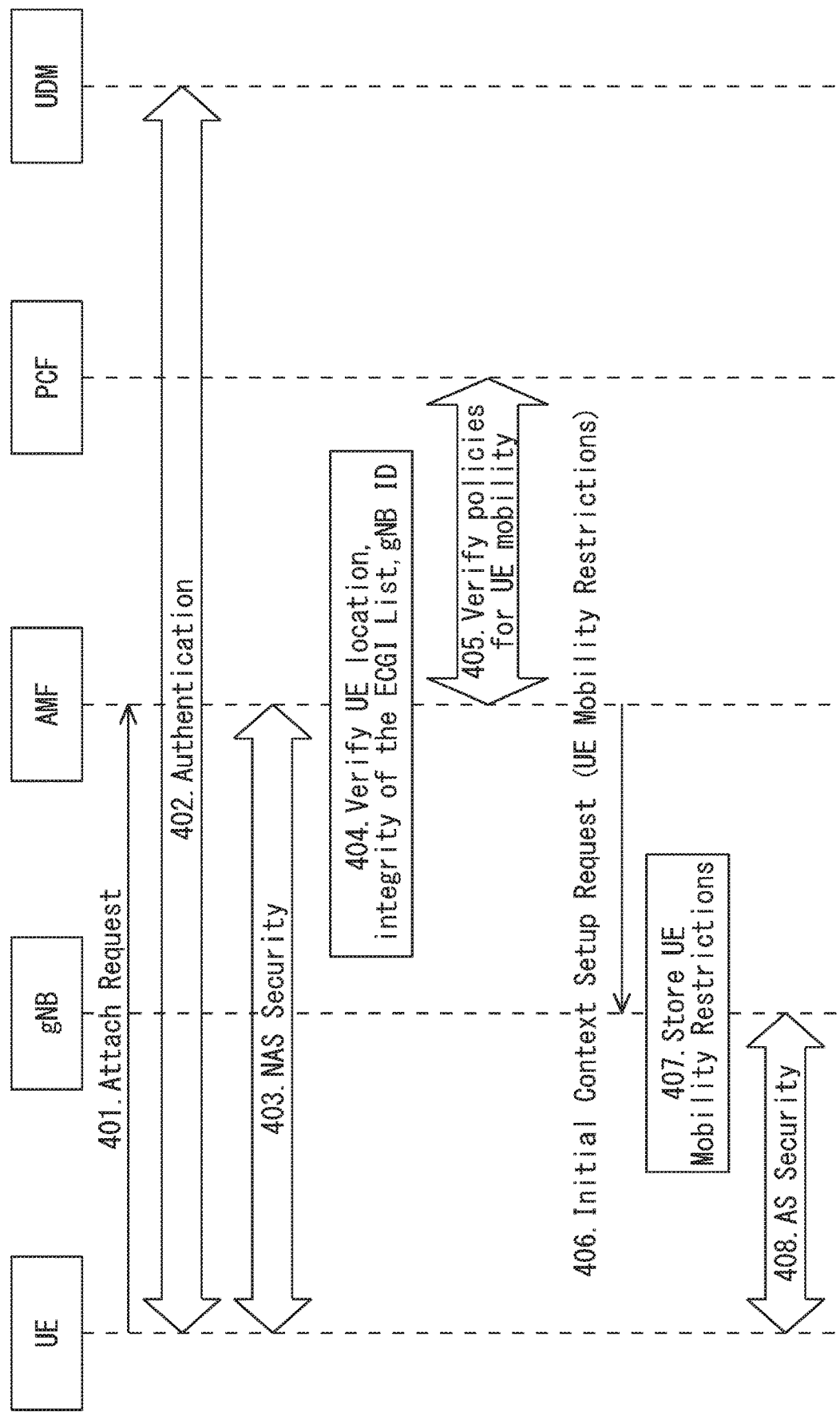
[Fig. 4]

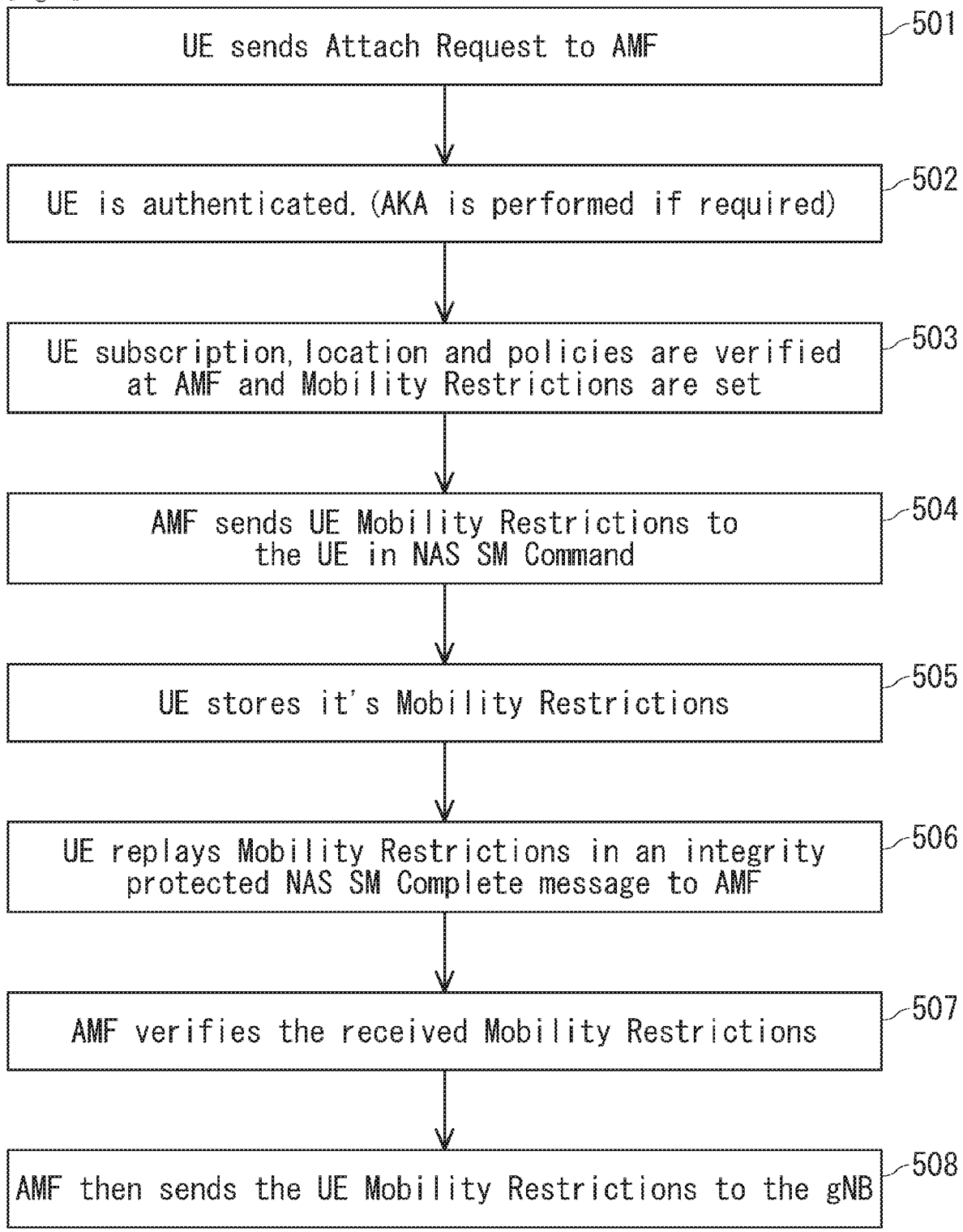
[Fig. 5]

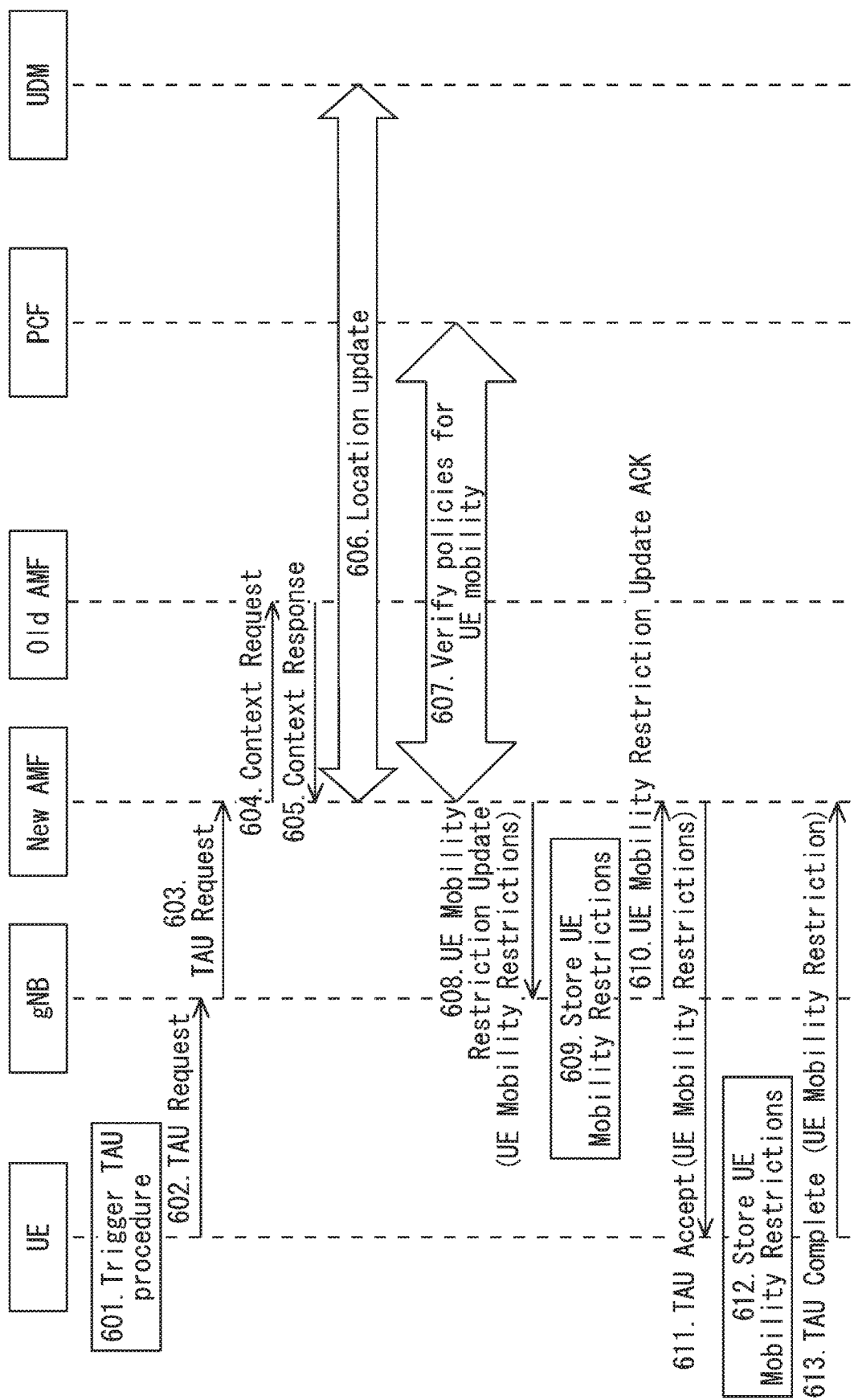

[Fig. 7]
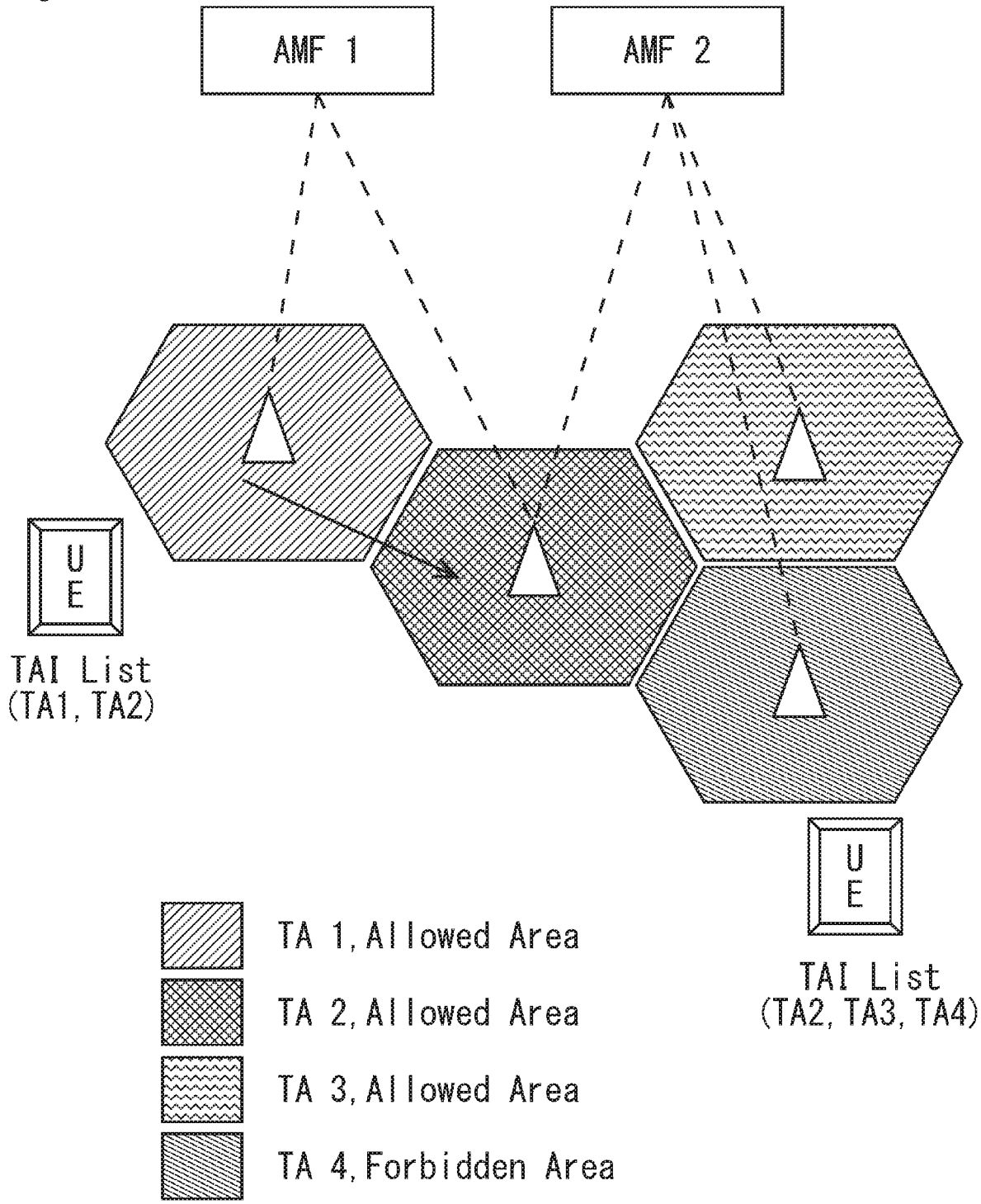

[Fig. 8]
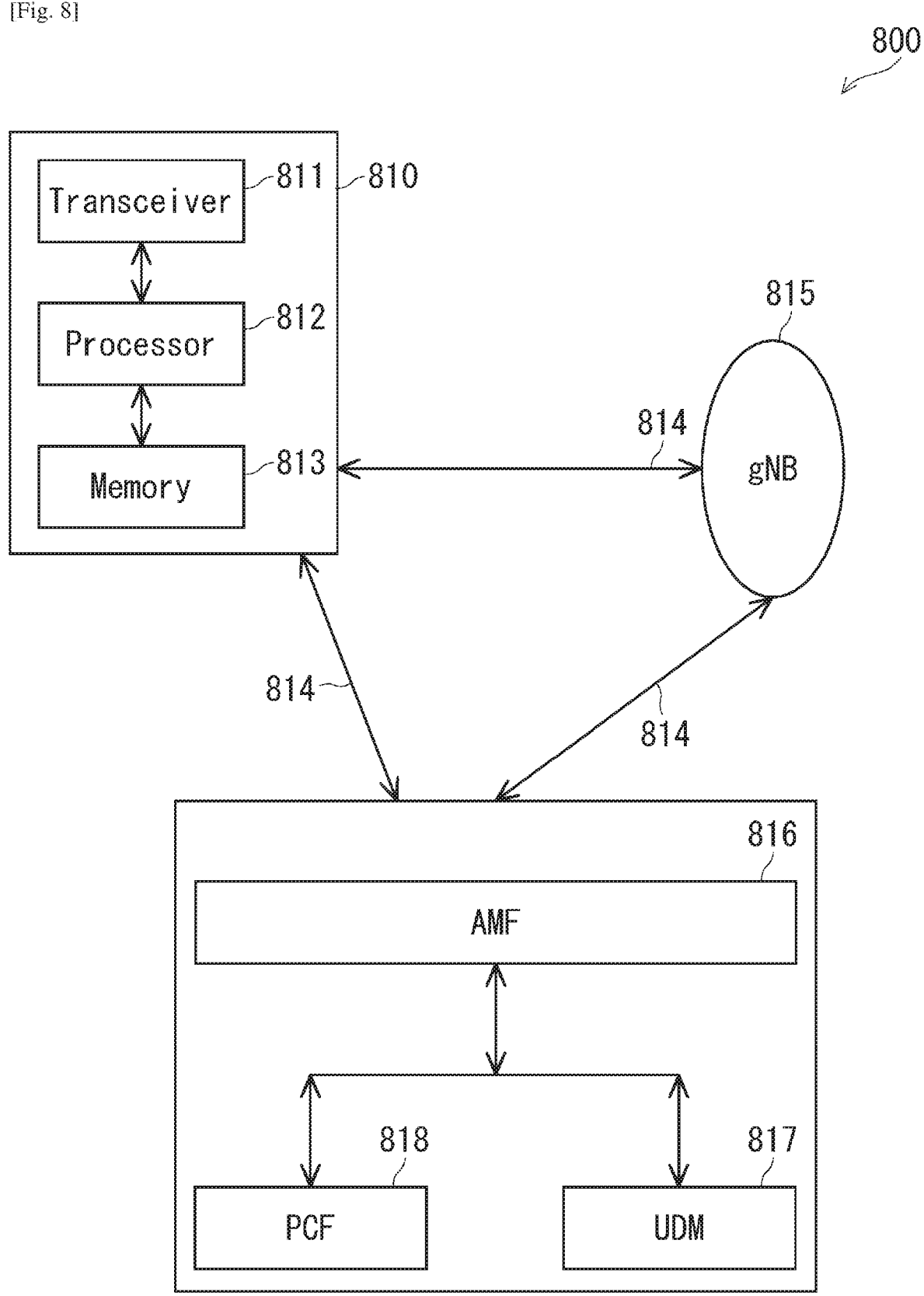

COMMUNICATION METHOD, COMMUNICATION SYSTEM, AND USER EQUIPMENT

CROSS REFERENCE TO RELATED APPLICATIONS

This application is a National Stage of International Application No. PCT/JP2018/020235 filed May 25, 2018, claiming priority based on Indian Patent Application No. 201711018750 filed May 29, 2017, the disclosures of which are incorporated herein in their entirety by reference.

TECHNICAL FIELD

The present invention relates to the method of communication. Specifically the present invention relates to a method of preventing a User equipment movement into the forbidden zone while in the active state.

BACKGROUND ART

The mobile communication is evolving steadily and the performance of different implementations have been increasing significantly. The provisioning of the advanced technologies in the smartphones have further increased the reliability on advanced technologies. Further, new applications provisioned for the advanced technologies have also increased the demand of such technologies with minimum infrastructure. The fourth generation technology have also increased the traffic on mobile networks and also diversified the mobile networks due to driving demand.

Further, while in a mobile network, manually provisioning and managing neighbor cells in traditional mobile network is a challenging task and it becomes more difficult as new mobile technologies are being rolled out while 2G/3G cells already exist. For LTE, task becomes challenging for operators, as in addition of defining intra LTE neighbour relations for eNBs operator has to provision neighboring 2G, 3G, CDMA2000 cells as well. Further, the mobile network also consists of several mobile restrictions.

TS 23.501 V0.4.0 (2017-04) clause states that "Mobility restrictions consists of RAT restriction, forbidden area, and service access restrictions as follows:

RAT restriction:
Defines the 3GPP Radio Access Technology (ies), a UE is not allowed to access. In a restricted RAT a UE is not permitted to initiate any communication with the network.

Forbidden area:
In a Forbidden area under a given RAT, the UE is not permitted to initiate any communication with the network.

Service access restrictions:
Defines areas in which the UE may or may not initiate communication with the network as follows:

Allowed area:
In an allowed area under a given RAT, the UE is permitted to initiate communication with the network as allowed by the subscription.

Non-allowed area:
In a non-allowed area under a given RAT, a UE is service access restricted. The UE is not allowed to initiate Service Request or SM signalling to obtain user services (both in CM-IDLE and in CM-CONNECTED states). The UE shall perform periodic registration updates and normal registration updates due to mobility. The UE in a Non-allowed area shall respond to core network paging.

For a given UE, the core network determines the service area restrictions based on UE subscription information. Optionally the allowed area may in addition be fine-tuned by the PCF e.g. based on UE location, and network policies. Service area restrictions can be changed due to, e.g. subscription, location, and/or policy change. Service area restrictions may be updated during a Registration procedure."

Further, TS 36.300 V14.2.0 (2017-03) clause 22.3.2a mentions an Automatic Neighbour Relation Function, which resides at the eNB and manages the Neighbour Relation Table (NRT).

For each NR, the NRT contains the Target Cell Identifier (TCI), which identifies the target cell. For E-UTRAN, the TCI corresponds to the E-UTAN Cell Global Identifier (ECGI) and Physical Cell Identifier (PCI) of the target cell. Furthermore, each NR has three attributes, the No Remove, the NoHO and the NoX2 attribute.

It also mentions that "eNBs shall keep neighboring eNBs updated with the complete list of served cells while the X2 interface is operational".

According to 3GPP specifications, the purpose of the Automatic Neighbour Relation (ANR) functionality is to relieve the operator from the burden of manually managing Neighbor Relations (NRs).

FIG. 1 shows ANR and its environment as per 3GPP. It shows interaction between eNB and O&M due to ANR.

Located within ANR, the Neighbour Detection Function finds new neighbours and adds them to the NRT. ANR also contains the Neighbour Removal Function which removes outdated NRs. The Neighbour Detection Function and the Neighbour Removal Function are implementation specific.

An existing Neighbour cell Relation (NR) from a source cell to a target cell means that eNB controlling the source cell knows the ECGI/CGI and Physical Cell Identifier (PCI) of the target cell and has an entry in the NRT for the source cell identifying the target cell.

For each cell that the eNB has, the eNB keeps a NRT. For each NR, the NRT contains the Target Cell Identifier (TCI), which identifies the target cell. For E-UTRAN, the TCI corresponds to the E-UTAN Cell Global Identifier (ECGI) and Physical Cell Identifier (PCI) of the target cell.

The ANR function relies on cells broadcasting their identity on global level, E-UTRAN Cell Global Identifier (ECGI) and allows O&M to manage the NRT. O&M can add and delete NRs. It can also change the attributes of the NRT. The O&M system is informed about changes in the NRT.

However, it may be possible that a UE in the 5G network may be handed over to the restricted zone when it is being served by a given slice. As a result, the UE loses service access and is not able to initiate any connection with the network. Further, the information on mobility restrictions may be tampered which can result in the UE landing in the forbidden zone.

Therefore, there is a requirement wherein the UE should stay within the allowed zone and not go to forbidden zone while UE is being served by a given slice and the information on mobility restrictions should not be tampered (must be integrity protected).

SUMMARY OF INVENTION

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

In order to overcome the problems as discussed above, the present invention provides solutions wherein in one aspect, it is proposed that by extending neighbour relation tables to include mobility restrictions in addition to neighbour cell information, the problem can be solved.

In another aspect of the present invention, it is proposed to send the neighbour cell restriction information (per UE) to the UE, gNB, UE and gNB.

A further aspect of the present invention provides mapping mobility restrictions with TA list and sending this along with the Handover Restriction List during handover.

The solutions proposed by the present invention provides a technical advantage of secure provisioning of mobility restriction to the UE & gNB in a given location, preventing UE movement to restricted area during connected state, Mapping mobility restriction with Tracking area list and extending NR table functionalities.

In an embodiment of the present invention, there is provided a method for a User Equipment (UE) wherein the method comprises of sending a measurement report from the UE to next generation nodeB (gNB); checking mobility restriction on a target cell in a neighbour relation (NR) table stored in the gNB; performing a handover on allowing the target cell by the gNB; and restricting handover to the cell on non-allowance of the target cell by the gNB, wherein the gNB notifying the UE to retransmit the measurement report on non-allowance of the target cell by the gNB. The gNB verifies the allowed target cells on reception of the measurement report from the UE, wherein the mobility restrictions for the cells in the NR table are mapped to the entries of an automatic neighbour relation function (ANR). The gNB further sends a request message comprising a SETUP request to an access management function (AMF) for the mobility restrictions per target cell, wherein the gNB updates the NR table on receiving the response from the AMF, wherein the response comprises of mobility restriction per target cell identifier. The gNB further sends a request message comprising a configuration update to the AMF, and on receiving the response from the AMF updating the NR table by changing the mobile restriction per target cell identifier.

In another embodiment of the present invention there is provided a communication method between at least one UE and at least one gNB over a wireless network, wherein an ATTACH (ACH) request message is sent to an AMF from the UE and the UE is authenticated. The AMF verifies the UE subscription and location information and the policies for UE mobility by a policy control function (PCF) is verified. Then an NAS SM command message is sent by the AMF to the UE wherein the NAS SM command comprises of mobility restrictions information. The mobility restrictions are stored in a database of the UE. Further, the NAS SM complete message is sent by the UE to the AMF in an integrity protected message wherein the received mobility restrictions is verified by the AMF sent by the UE in the integrity protected message and thereafter the UE mobility restrictions are sent to the gNB by the AMF.

Another embodiment of the present invention provides a communication method between at least one UE and at least one gNB over a wireless network, wherein an ATTACH request message is sent to an AMF from the UE and the UE is authenticated. An NAS SM to the AMF by the UE. The AMF verifies the UE location information, gNB ID and integrity of the E-UTRAN cell global identification (ECGI) list and sends an Initial Context Setup Request message to the gNB. Further, the UE mobility restrictions is stored in a database of the gNB and thereafter establishes AS Security with the UE wherein the UE acknowledges the AS security with the gNB.

Another embodiment of the present invention provides a method in between at least one UE and at least one gNB over a wireless network, wherein a tracking area update (TAU) procedure is triggered by the UE and a TAU request is sent by the UE to the new AMF via the gNB. Further, a Context Request message is sent by the New AMF to the old AMF wherein the old AMF sends the UE contexts to the new AMF. The location of the UE is updated the new AMF to a unified data management (UDM) and a PCF verifies the policies for the UE mobility for new AMF. The AMF updates the UE mobility restrictions to the gNB. The gNB stores the UE mobility restrictions in a database of the gNB and sends an acknowledgement of UE mobility restriction update to the new AMF wherein a TAU ACCEPT message is sent to the UE by the new AMF. The UE mobility restrictions are stored on a database of the UE and wherein a TAU COMPELTE message is sent by the UE to the new AMF. Further, for an Xn handover the AMF sends the UE mobility restrictions to the gNB in a path switch response and the UE mobility restrictions to the UE in a handover command. In an N2 handover the AMF sends the UE mobility restrictions to the target gNB in a handover request and the UE mobility restrictions to the UE in a handover command. The mobility restrictions are updated at the UE for every TAU and the mobility restrictions of the UE are mapped with the TA wherein the mapping information is stored with a tracking area identity (TAI) list. Further, when a tracking area (TA) is listed as Forbidden the handover is rejected. Further, a source NG (R)AN requests the mobility restriction of the UE in a target NG (R)AN to the AMF before Handover Request is sent to the target NG (R)AN.

Another embodiment of the present invention provides a communication system comprises of different means for sending a measurement report to next generation nodeB (gNB); for checking mobility restriction on a target cell in an NR table stored in the gNB; for performing a handover on allowing the target cell by the gNB; and for restricting handover to the cell on non-allowance of the target cell by the gNB; wherein on the non-allowance of the target cell by the gNB, the gNB notify the means to retransmit the measurement report. The means transmitting the measurement report to the gNB for further verification of the allowed target cells wherein the mobility restrictions for the cells in the NR table are mapped to the entries of an ANR. The gNB sends a request message comprising a setup request to an AMF for the mobility restrictions per target cell and updates the NR table on receiving the response from the AMF, wherein the response comprises of mobility restriction per target cell identifier. The gNB further sends a request message comprising a configuration update to the AMF, and on receiving the response from the AMF updating the NR table by changing the mobile restriction per target cell identifier.

Another embodiment of the present invention provides a communication system of a wireless network, wherein the system comprises of different means for sending an ATTACH request message to an AMF; for verifying a UE subscription and location information; for verifying the policies for UE mobility; for sending to the UE an NAS SM command message wherein the NAS SM command comprises of mobility restrictions information; for storing the mobility restrictions in a database; for sending NAS SM complete message to the AMF in an integrity protected message; for verifying the received mobility restrictions sent by the UE in the integrity protected message; for sending the UE mobility restrictions to a gNB.

Another embodiment of the present invention provides a communication system comprising at least one UE and at least one gNB over a wireless network, the system comprises of different means for sending an ATTACH request message to an AMF; for authenticating the UE; for sending an NAS SM to the AMF; for verifying the UE location information, gNB ID and integrity of the ECGI list; for sending an Initial Context Setup Request message to the gNB; for storing the UE mobility restrictions in a database; for establishing AS Security with the UE; for acknowledging the AS security with the gNB.

In yet another embodiment of the present invention a communication system is provided comprising at least one UE and at least one gNB over a wireless network, wherein the system comprises of different means for triggering a TAU procedure; for sending a TAU request to a new AMF via the gNB; for sending a Context Request message to the old AMF wherein the old AMF sends the UE contexts to the new AMF; for updating the location of the UE to the UDM; for verifying the policies for UE mobility for new AMF; means for updating the UE mobility restrictions to the gNB; means for storing the UE mobility restrictions in a database of the gNB; for sending an acknowledgement of UE mobility restriction update to the new AMF; for sending a TAU ACCEPT message to the UE; for storing the UE mobility restrictions on a database of the UE; for sending a TAU COMPELTE message to the new AMF. For an Xn handover the AMF sends the UE mobility restrictions to the gNB in a path switch response the UE mobility restrictions to the UE in a handover command. However, in an N2 handover the AMF sends the UE mobility restrictions to the target gNB in a handover request the UE mobility restrictions to the UE in a handover command. The mobility restrictions are updated at the UE for every TAU and are mapped with the TA, wherein the mapping information is stored with a TAI list. When the TA is listed as Forbidden the handover is rejected. However, a source NG (R)AN requests the mobility restriction of the UE in a target NG (R)AN to the AMF before Handover Request is sent to the target NG (R)AN.

In yet another embodiment of the present invention a user equipment for a communication in a wireless network is provided wherein a processor is configured to send a measurement report to next generation nodeB (gNB) wherein the gNB checks the mobility restriction on a target cell in an NR table stored therein and performing a handover on allowing the target cell by the gNB, the gNB is further configured to restrict handover to the cell on non-allowance of the target cell, wherein the gNB causes the processor to retransmit the measurement report on the non-allowance of the target cell. The gNB is further configured to verify the allowed target cells on reception of the measurement report from the processor wherein the mobility restrictions for the cells in the NR table are mapped to the entries of an ANR. The gNB is also configured to send a request message comprising a setup request to an AMF for the mobility restrictions per target cell and to update the NR table on receiving the response from the AMF, wherein the response comprises of mobility restriction per target cell identifier. The gNB is also configured to send a request message comprising a configuration update to the AMF, and on receiving the response from the AMF updating the NR table by changing the mobile restriction per target cell identifier.

In yet another embodiment of the present invention a user equipment for a communication in a wireless network is provided wherein a processor is configured to send an ATTACH request message to an AMF, the AMF on authenticating the processor, is configured to verify the UE subscription and location information and a PCF is configured to verify the policies for the processor, the processor is further configured to receive an NAS SM command message from the AMF wherein the NAS SM command comprises of mobility restrictions information; a memory configured to store the mobility restrictions in a database of the UE; the processor is configured transmit an NAS SM complete message to the AMF in an integrity protected message wherein the AMF is configured to verify the received mobility restrictions transmitted by the processor in the integrity protected message and sending the UE mobility restrictions to the gNB by the AMF.

In yet another embodiment of the present invention a user equipment for a communication in a wireless network is provided wherein a processor is configured to send an ATTACH request message to an AMF, the AMF is configured to authenticate the processor, the processor is further configured to send an NAS SM to the AMF wherein the AMF verifies the UE location information, gNB ID and integrity of the ECGI list and sending an Initial Context Setup Request message to the gNB, wherein the gNB comprises a memory for storing the UE mobility restrictions in a database and the gNB is further configured to establish AS security with the UE wherein the UE acknowledges the AS security to the gNB.

In yet another embodiment of the present invention a user equipment for a communication in a wireless network is provided wherein a processor is configured to trigger a TAU procedure and to transmit a TAU request to the new AMF via the gNB, the new AMF is configured to transmit a Context Request message to the old AMF wherein the old AMF transmits the UE contexts to the new AMF, the new AMF updates the location of the UE to a UDM and wherein a PCF verifies the policies for UE mobility for the new AMF, the new AMF is further configured to update the UE mobility restrictions to the gNB, the gNB comprises a memory for storing the UE mobility restrictions in a database and configured to transmit an acknowledgement of UE mobility restriction update to the new AMF and causes the new AMF to transmit a TAU ACCEPT message to the UE, wherein the UE comprises a memory for storing the mobility restrictions in a database and configured to transmit a TAU COMPELTE message to the new AMF. For Xn handover the AMF is configured to transmit the UE mobility restrictions to the gNB in a path switch response. The AMF is also configured to transmit the UE mobility restrictions to the UE in a handover command. In an N2 handover the AMF is configured to transmit the UE mobility restrictions to the target gNB in a handover request. In a handover command the AMF is configured to transmit the UE mobility restrictions to the UE wherein the mobility restrictions are updated at the UE for every TAU and wherein the mobility restrictions of the UE are mapped with the TA. The mapping information is stored with a TAI list wherein when the TA is listed as Forbidden the handover is rejected. Further, a source NG (R)AN requests the mobility restriction of the UE in a target NG (R)AN to the AMF before Handover Request is sent to the target NG (R)AN.

BRIEF DESCRIPTION OF DRAWINGS

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

FIG. 1 illustrates ANR and its environment as per 3GPP. It shows interaction between eNB and O&M due to ANR.

FIG. 2A illustrates a handover method in accordance with the present disclosure method.

FIG. 2B illustrates a handover method in accordance with the present disclosure method.

FIG. 2C illustrates a handover method in accordance with the present disclosure method.

FIG. 2D illustrates a handover method in accordance with the present disclosure method.

FIG. 3 shows sending neighbour cell restriction information (per UE) to the UE in accordance with the present disclosure.

FIG. 4 illustrates a procedure sending neighbour cell restriction information (per UE) to the gNB in accordance with the present disclosure.

FIG. 5 illustrates a flow diagram showing the procedure for sending neighbour cell restriction information (per UE) in accordance with the present disclosure.

FIG. 6 illustrates a procedure for provisioning UE Mobility restrictions during Idle Mode Mobility.

FIG. 7 illustrates a procedure for restricting HO to Forbidden Zone.

FIG. 8 illustrates a User Equipment in communication with a wireless network.

DESCRIPTION OF EMBODIMENTS

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals in claims illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

In an embodiment of the present invention as shown in FIG. 2(A), FIG. 2(B), FIG. 2(C) and FIG. 2(D), a method of communication for securing the provisioning of User Equipment (UE) mobility restriction by extending the neighbour relation table in addition to neighbour cell information is described.

The gNB on initial S1 setup and configuration updates may request the AMF for mobility restrictions per cell. A detailed operation of setting up the restrictions are discussed in the document (3GPP TS 36.413 V14.2.0 (2017-03)). The gNB sends a S1 Setup Request to the Access and Mobility function (AMF) and upon receiving the S1 Setup Response from the AMF to the gNB, updates the Neighbour relation (NR) table. A table such as ANR as referred to the document (TS 36.300 V14.2.0 (2017-03)) is available at the gNB containing neighbouring cell information. This table consists of the {TCI (PCI+ECGI), No remove, No HO, No X2}.

Further, the updating of restrictions are also discussed in detail in the aforementioned document. For example, in case configuration updates are required, the message sequence as represented in FIG. 2(B) may be used to request the AMF for mobility restriction updates per cell.

FIG. 2 (C), describes the handover method wherein at (201), a UE sends a measurement report to a next generation nodeB (gNB). The gNB upon receiving the measurement report received from the UE checks at (202), the mobility restriction on a target cell in a neighbour relation (NR) table stored in the gNB. Upon checking the mobility restriction at (203), if the cell is allowed, it performs handover at (205). However, if at step (203), the target cell is not allowed, the gNB at (204), restricts the handover to the cell and informs the UE to send the measurement report again. The gNB verifies the allowed target cells each time on reception of the measurement report from the UE, wherein the mobility restrictions for the cells in the NR table are mapped to the entries of an automatic neighbour relation function (ANR).

The gNB also sends a request message comprising a SETUP request to an access management function (AMF) for the mobility restrictions per target cell, wherein the gNB updates the NR table on receiving the response from the AMF. The response received from the AMF comprises of mobility restriction per target cell identifier. The gNB is also configured to send a request message comprising a configuration update to the AMF, and on receiving the response from the AMF, the gNB updates the NR table by changing the mobile restriction per target cell identifier.

In FIG. 2(D), it is clearly described that when a UE sends a measurement report to the gNB, the gNB verifies the unrestricted target cells and if the target cells are unrestricted, only in that case, the handover is done. It is to be understood that the present invention by checking the allowed target cells ensures that a UE should stay within the allowed zone and while handing over the UE should not lose the services.

The below table shows that the mobility restrictions on the cell entries in the NRT can be mapped to the entries available in the ANR as {TCI (PCI+ECGI), No remove, No HO, No X2, Forbidden}

TABLE 1

| NR | TCI | No Remove | No HO | No X2 | Forbidden |
|---|---|---|---|---|---|
| 1 | TCI#a | ✓ | ✓ |  | ✓ |
| 2 | TCI#b |  |  | ✓ |  |
| 3 | TCI#c |  | ✓ |  |  |

It is to be noted that similar entries can be added for Non-allowed/Allowed areas. One way to do this is to add a column for Non-allowed area (The TCI that have no ticks in Forbidden and Non-allowed areas are taken to be Allowed, by default).

Further, during inter-cell and Xn handover, the gNB uses this information to ensure that the UE does not move to a cell that is listed as forbidden. However, it is to be noted that as the ANR is gNB-specific, to provision Mobility restriction information per UE, a table with {TCI, Mobility restriction} can be provided to the gNB (for each UE connected to it) which is sent in the Initial Context Setup Message.

In another embodiment of the present invention as shown in FIG. 3*l* discloses sending the neighbour cell restriction information (per UE) to the UE. In this embodiment, the AMF sends the UE mobility restriction information to the UE.

In this embodiment of the present invention, at step (301), an ATTACH (ACH) request message is sent to an AMF from the UE. At (302), the UE is authenticated. The authentication of the UE can be done by the different functions for different functionalities, wherein the AMF can authenticate the UE for the Access functions wherein the PCF authenticates the UE for different policy controls of the UE. The AMF at (303) verifies the UE subscription and location information. At (304) the policies for the UE mobility by a policy control function (PCF) is verified. After the verifications of the subscription, location and policy verification a Non-access stratum session management (NAS SM) command message is sent at (305) by the AMF to the UE wherein the NAS SM command comprises of mobility restrictions information. The mobility restrictions are stored in a database of the UE which could be a memory. At (307), the NAS SM complete message is sent by the UE to the AMF in an integrity protected message. At (308(*a*)), the AMF verifies the integrity of the message and at (308(*b*)), the AMF verifies the replayed UE mobility restriction. It is to be understood that during handover, the UE sends the stored "UE Mobility Restrictions" to the gNB, which uses this information to ensure that the UE doesn't move to a cell that is forbidden.

In another embodiment of the present invention as shown in FIG. 4, discloses sending the neighbour cell restriction information (per UE) to the gNB. In this embodiment, the AMF sends the UE mobility restriction information to the gNB.

In this embodiment of the present invention, at (401), an ATTACH request message is sent to an AMF from the UE. At (402) the UE is authenticated. The authentication of the UE can be done by the different functions for different functionalities, wherein the AMF can authenticate the UE for the Access functions wherein the PCF authenticates the UE for different policy controls of the UE. At (403), an NAS SM command message is sent to the AMF by the UE. The AMF upon receiving NAS SM command message. At (405), the AMF verifies the UE location information, gNB ID and integrity of the E-UTRAN cell global identification (ECGI) list. Upon verification of the UE policies for UE mobility, the AMF at (406) sends an Initial Context Setup Request message to the gNB in an N2 interface between the AMF and the gNB. At (407), the UE mobility restrictions is stored in a database of the gNB which could be a memory. Upon storing the UE mobility restrictions data, the gNB establishes AS Security at (408) with the UE wherein the UE acknowledges the AS security with the gNB. Therefore, the UE gNB uses the stored "UE Mobility Restrictions" to ensure that the UE doesn't move to a cell that is forbidden.

However, there could be an issue with implementation of the above-mentioned embodiments, separately, such as the UE could be infected with malware. Therefore, another embodiment of the present invention is provided wherein both the UE and the gNB contain the UE mobility restrictions.

In this embodiment of the present invention, as shown in FIG. 5, at (501), an ATTACH request is sent to the AMF by a UE. At (502), the UE is authenticated wherein if required an authentication and session key distribution is performed. The authentication of the UE can be done by the different functions for different functionalities, wherein the AMF can authenticate the UE for the Access functions wherein the PCF authenticates the UE for different policy controls of the UE. At (503), the UE subscription, location and policies are verified by the AMF and based on the verification, the mobility restrictions are set. At (504), the AMF sends the UE mobility restrictions to the UE in a NAS SM command message. At (505), the UE stores its mobility restrictions. At (506), the UE replays the mobility restrictions in an integrity protected NAS SM complete message which is sent to the AMF. At (507), the AMF verifies the received mobility restrictions. At 508, the AMF sends the UE mobility restrictions to the gNB. The UE sends the mobility restrictions to the gNB.

The gNB verifies it with the restriction information that it holds and then makes the handover decision. If the restrictions do not match, then, it means that either the UE or eNB is rogue.

In another embodiment of the present invention as shown in FIG. 6, discloses provisioning of UE Mobility restrictions during mobility, which could be during the idle mode mobility.

In this embodiment of the present invention, at (601), a tracking area update (TAU) procedure is triggered by the UE. At (602), the TAU request is sent by the UE to the new AMF. At (603), the TAU request is further sent to the gNB.

At (604), a Context Request message is sent by the New AMF to the old AMF. Upon receiving the Context Request message, the old AMF at (605) sends the UE contexts to the new AMF. At (606), the location of the UE is updated by the new AMF to a unified data management (UDM). At (607), a PCF verifies the policies for the UE mobility for new AMF. At (608), the New AMF updates the UE mobility restrictions to the gNB. At (609), the gNB stores the UE mobility restrictions in a database of the gNB which could be a memory. At (610), the gNB sends an acknowledgement (ACK) of UE mobility restriction update to the new AMF. At (611), a TAU ACCEPT message is sent to the UE by the new AMF. On reception of the TAU ACCEPT message, the UE mobility restrictions are stored at (612) on a database, which could be a memory, of the UE. At (613), a TAU COMPELTE message is sent by the UE to the new AMF. The TAU complete message comprises of UE mobility restrictions. In the present invention, during idle mode mobility, when there is an update of the location of the UE, the policies for UE mobility are verified with the PCF or any entity handling such information. Further, the UE Mobility restrictions are updated at the gNB using the UE Mobility Restriction Update message.

Further, for an Xn handover the AMF sends the UE mobility restrictions to the gNB in a path switch response and the UE mobility restrictions to the UE in a handover command. In an N2 handover the AMF sends the UE mobility restrictions to the target gNB in a handover request and the UE mobility restrictions to the UE in a handover command.

The mobility restrictions are updated at the UE for every TAU and the mobility restrictions of the UE are mapped with the TA wherein the mapping information is stored with a tracking area identity (TAI) list. Further, when a tracking area (TA) is listed as Forbidden the handover is rejected. Further, a source NG (R)AN requests the mobility restriction of the UE in a target NG (R)AN to the AMF before Handover Request is sent to the target NG (R)AN.

The present invention also provides a solution wherein the UE mobility restrictions are mapped with the TA. Therefore, if the mobility restriction are configured per TA, this information can be updated at the UE after every TAU. This information can be stored along with the TAI List as shown in below table:

TABLE 2

| TAI List |
| --- |
| TA1, Allowed |
| TA2, Restricted |
| TA3, Non-Allowed |
| TA4, Allowed |

Further, the document TS 36.413 V14.2.0 (2017-03) clause 8.3.1.2 mentions Handover Restriction List as an optional IE in Initial Context Setup Message sent by the MME to the eNB. This IE consists of information about the forbidden TAs that the UE cannot be handed over to.

TS 23.501 V0.4.0 (2017-04) clause 5.3.4.1.1 mentions that, "In CM-CONNECTED state, the core network provides Mobility Restrictions to the radio access network with a Handover Restriction List."

However, in 5G, this IE has to be made mandatory. The gNB can use the {TAI, UE mobility restriction} along with the handover restriction to ensure that a UE is not handed over to the forbidden zone.

Further, in restricting the HO to Forbidden Zone as shown in FIG. 7, in case of handover the UE needs to mandatorily send the UE Mobility Restriction Information (mandatorily integrity protected) to the source gNB. The gNB uses this information and the restrictions in the Handover Restriction List to find if a TA is forbidden or not. If the TA is listed as Forbidden, then handover is rejected. In case the TA is not available in the TA list during mobility, the source NG (R)AN requests the mobility restriction of the UE in the target NG (R)AN to the AMF before Handover Request is sent to the target NG (R)AN.

The present invention also discloses a communication system comprising of different means for sending a measurement report to next generation nodeB (gNB). The present invention also provides means for checking mobility restriction on a target cell in an NR table stored in the gNB and for performing a handover on allowing the target cell by the gNB, for restricting handover to the cell on non-allowance of the target cell by the gNB; wherein on the non-allowance of the target cell by the gNB, the gNB notify the means to retransmit the measurement report. The means transmitting the measurement report to the gNB for further verification of the allowed target cells wherein the mobility restrictions for the cells in the NR table are mapped to the entries of an ANR. The gNB sends a request message comprising a setup request to an AMF for the mobility restrictions per target cell and updates the NR table on receiving the response from the AMF, wherein the response comprises of mobility restriction per target cell identifier. The gNB further sends a request message comprising a configuration update to the AMF, and on receiving the response from the AMF updating the NR table by changing the mobile restriction per target cell identifier.

The present invention also discloses a communication system of a wireless network, wherein the system comprises of different means for sending an ATTACH request message to an AMF. The present invention also have means for verifying a UE subscription and location information, means for verifying the policies for UE mobility, means for sending to the UE an NAS SM command message wherein the NAS SM command comprises of mobility restrictions information; means for storing the mobility restrictions in a database, means for sending NAS SM complete message to the AMF in an integrity protected message, means for verifying the received mobility restrictions sent by the UE in the integrity protected message and means for sending the UE mobility restrictions to a gNB.

The present invention further discloses a communication system comprising at least one UE and at least one gNB over a wireless network, the system comprises of different means for sending an ATTACH request message to an AMF; for authenticating the UE; for sending an NAS SM to the AMF; for verifying the UE location information, gNB ID and integrity of the ECGI list; for sending an Initial Context Setup Request message to the gNB; for storing the UE mobility restrictions in a database; for establishing AS Security with the UE; for acknowledging the AS security with the gNB.

The present invention also provides a communication system comprising at least one UE and at least one gNB over a wireless network, wherein the system comprises of different means for triggering a TAU procedure; for sending a TAU request to a new AMF via the gNB; for sending a Context Request message to the old AMF wherein the old AMF sends the UE contexts to the new AMF; for updating the location of the UE to the UDM; for verifying the policies for UE mobility for new AMF; means for updating the UE mobility restrictions to the gNB; means for storing the UE mobility restrictions in a database of the gNB; for sending an acknowledgement of UE mobility restriction update to the new AMF; for sending a TAU ACCEPT message to the UE; for storing the UE mobility restrictions on a database of the UE; for sending a TAU COMPELTE message to the new AMF. For an Xn handover the AMF sends the UE mobility restrictions to the gNB in a path switch response and the UE mobility restrictions to the UE in a handover command. However, in an N2 handover the AMF sends the UE mobility restrictions to the target gNB in a handover request and the UE mobility restrictions to the UE in a handover command. The mobility restrictions are updated at the UE for every TAU and are mapped with the TA, wherein the mapping information is stored with a TAI list. When the TA is listed as Forbidden the handover is rejected. However, a source NG (R)AN requests the mobility restriction of the UE in a target NG (R)AN to the AMF before Handover Request is sent to the target NG (R)AN.

The present invention also discloses a user equipment (810) for a communication in a wireless/communication network (814) as illustrated in FIG. 8. A processor (812) is configured to send a measurement report to next generation nodeB (gNB) (815), wherein the gNB (815) checks the mobility restriction on a target cell in the NR table stored therein and performing a handover on allowing the target cell by the gNB (815), the gNB (815) is further configured to restrict handover to the cell on non-allowance of the target cell and wherein the gNB (815) causes the processor (812) to retransmit the measurement report through transceiver (811) on the non-allowance of the target cell. The gNB (815) is further configured to verify the allowed target cells on reception of the measurement report from the processor (812) wherein the mobility restrictions for the cells in the NR table are mapped to the entries of an ANR. The gNB is also configured to send a request message comprising a setup request sent to an AMF (816) for the mobility restrictions per target cell and to update the NR table on receiving the response from the AMF (816), wherein the response comprises of mobility restriction per target cell identifier. The gNB (815) is also configured to send a request message comprising a configuration update sent to the AMF (816), and on receiving the response from the AMF (816), updating the NR table by changing the mobile restriction per target cell identifier.

The present invention further discloses a user equipment (810) for communication in a wireless/communication network (814), wherein a processor (812) is configured to send an ATTACH request message to an AMF (816), the AMF (816) on authenticating the processor (812), is configured to verify the UE (810) subscription and location information and a PCF (818) is configured to verify the policies for the processor (812), the processor (812) is further configured to receive an NAS SM command message from the AMF (816) wherein the NAS SM command comprises of mobility restrictions information; a memory (813) configured to store the mobility restrictions in a database of the UE (810); the processor (812) is configured to transmit an NAS SM complete message to the AMF (816) in an integrity protected message wherein the AMF (816) is configured to verify the received mobility restrictions transmitted by the processor in the integrity protected message and sending the UE mobility restrictions to the gNB (815) by the AMF (816).

The present invention also discloses a user equipment (810) for communication in a wireless network (814) wherein a processor (812) is configured to send an ATTACH request message to an AMF (816) through a transceiver (811), the AMF (816) is configured to authenticate the processor (812), the processor (812) is further configured to send an NAS SM to the AMF (816) wherein the AMF (816) verifies the UE (810) location information, gNB ID and integrity of the ECGI list and sending an Initial Context Setup Request message to the gNB (815), wherein the gNB (815) comprises a memory for storing the UE mobility restrictions in a database and the gNB (815) is further configured to establish AS security with the UE (810) wherein the UE acknowledges the AS security to the gNB (815).

The present invention further provides a user equipment (810) for communication in a wireless/communication network (814) wherein a processor (812) is configured to trigger a TAU procedure and to transmit a TAU request to the new AMF (816) via the gNB (815), the new AMF is configured to transmit a Context Request message to the old AMF wherein the old AMF transmits the UE contexts to the new AMF, the new AMF updates the location of the UE (810) to a UDM (817) and wherein a PCF (818) verifies the policies for UE mobility for the new AMF, the new AMF is further configured to update the UE mobility restrictions to the gNB (815), the gNB comprises a memory for storing the UE mobility restrictions in a database and configured to transmit an acknowledgement of UE mobility restriction update to the new AMF and causes the new AMF to transmit a TAU ACCEPT message to the UE, wherein the UE (810) comprises a database which could be a memory (813) for storing the mobility restrictions and configured to transmit a TAU COMPELTE message to the new AMF. For Xn handover the AMF is configured to transmit the UE mobility restrictions to the gNB (815) in a path switch response. The AMF (816) is also configured to transmit the UE mobility restrictions to the UE in a handover command. In an N2 handover the AMF (816) is configured to transmit the UE mobility restrictions to the target gNB in a handover request. In a handover command the AMF (816) is configured to transmit the UE mobility restrictions to the UE wherein the mobility restrictions are updated at the UE for every TAU and wherein the mobility restrictions of the UE are mapped with the TA. The mapping information is stored with a TAI list wherein when the TA is listed as Forbidden the handover is rejected. Further, a source NG (R)AN requests the mobility restriction of the UE in a target NG (R)AN to the AMF (816) before Handover Request is sent to the target NG (R)AN.

Advantages

The present disclosure provides secure provisioning of Mobility restriction to the UE & gNB in a given location and therefore preventing UE movement to restricted area during connected state. The present invention also maps the mobility restriction with Tracking area list and extending NR table functionalities. As will be appreciated by one of skill in the art, the present disclosure may be embodied as a method, and apparatus. Accordingly, the present disclosure may take the form of an entirely hardware embodiment, a software embodiment or an embodiment combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

REFERENCE SIGNS LIST

810 user equipment
811 transceiver
812 processor
813 memory
814 wireless network
815 gNB
816 AMF
817 UDM
818 PCF

The invention claimed is:

1. A method of a user equipment (UE) for a communication in a wireless network, the method comprising:
sending a measurement report to next generation nodeB (gNB); wherein
UE mobility restriction on a target cell in a neighbour relation (NR) table stored in the gNB is checked;
a handover based on allowance of the target cell by the gNB is performed; and
a handover to the target cell based on non-allowance of the target cell by the gNB is restricted, wherein the method further comprising:
receiving a notification from the gNB to retransmit the measurement report on the non-allowance of the target cell by the gNB, and
wherein a SETUP request to an access management function (AMF) for the UE mobility restrictions per target cell is included in a request message which is sent by the gNB.

2. The method as claimed in claim 1, wherein the allowed target cells on reception of the measurement report from the UE are verified by the gNB.

3. The method as claimed in claim 1, wherein the UE mobility restrictions for the cells in the NR table are mapped to entries of an automatic neighbour relation function (ANR).

4. The method as claimed in claim 1, wherein the NR table is updated by the gNB on receiving a response from the AMF, and the response comprises of the UE mobility restriction per target cell identifier.

5. The method as claimed in claim 1, wherein a request message comprising a configuration update to the AMF is sent by the gNB, and on receiving a response from the AMF updating the NR table by changing the mobile restriction per target cell identifier.

6. A user equipment for a communication in a wireless network comprising:
a processor configured to send a measurement report to next generation nodeB (gNB) wherein
UE mobility restriction on a target cell in an NR table stored in the gNB is checked by the gNB and
a handover based on allowance of the target cell by the gNB is performed,
a handover to the target cell based on non-allowance of the target cell is restricted by the gNB, wherein further comprising:
a receiver configured to receive a notification from the gNB to retransmit the measurement report on the non-allowance of the target cell by the gNB, and
wherein a setup request to an AMF for the UE mobility restrictions per target cell is included in a request message which is sent by the gNB.

7. The user equipment as claimed in claim 6, wherein the allowed target cells on reception of the measurement report from the processor are verified by the gNB.

8. The user equipment as claimed in claim 6, wherein the UE mobility restrictions for the cells in the NR table are mapped to entries of an ANR.

9. The user equipment as claimed in claim 6, wherein the NR table is updated by the gNB on receiving a response from the AMF, wherein the response comprises of the UE mobility restriction per target cell identifier.

10. The user equipment as claimed in claim 6, wherein a request message comprising a configuration update to the AMF is sent by the gNB, and on receiving a response from the AMF updating the NR table by changing the mobile restriction per target cell identifier.

11. The user equipment as claimed in claim 6, wherein the UE mobility restrictions for the cells in the NR table are mapped to entries of an ANR.

12. The user equipment as claimed in claim 6, wherein the gNB is configured to update the NR table on receiving a response from the AMF, wherein the response comprises of the UE mobility restriction per target cell identifier.

13. The user equipment as claimed in claim 6, wherein the gNB is configured to send a request message comprising a configuration update to the AMF, and on receiving a response from the AMF updating the NR table by changing the mobile restriction per target cell identifier.

14. A next generation nodeB (gNB) for a communication in a wireless network comprising:
a processor configured to receive a measurement report from user equipment (UE); and
configured to check UE mobility restriction on a target cell in an NR table stored in the gNB; wherein
a handover based on allowance of the target cell by the gNB is performed, the gNB is further configured to restrict a handover to the target cell based on non-allowance of the target cell; and configured to notify the UE to retransmit the measurement report on the non-allowance of the target cell by the gNB, and wherein the gNB is configured to send a request message comprising a setup request to an AMF for the UE mobility restrictions per target cell.

15. The gNB as claimed in claim 14, wherein the gNB is configured to verify the allowed target cells on reception of the measurement report from the processor.

* * * * *